United States Patent
Falcon

(10) Patent No.: US 6,929,753 B1
(45) Date of Patent: Aug. 16, 2005

(54) COAL BED METHANE WASTEWATER TREATMENT SYSTEM

(75) Inventor: Mel D. Falcon, Williston, ND (US)

(73) Assignee: Aqua-Envirotech Mfg., Inc., Williston, ND (US)

( * ) Notice: Subject to any disclaimer, the term of this patent is extended or adjusted under 35 U.S.C. 154(b) by 133 days.

(21) Appl. No.: 10/668,806

(22) Filed: Sep. 22, 2003

(51) Int. Cl.$^7$ ................................. C02F 1/78
(52) U.S. Cl. .................. 210/760; 210/747; 210/798; 210/806; 210/170; 210/205; 210/259; 210/333.01; 210/335; 210/411
(58) Field of Search .............. 210/747, 760, 210/798, 806, 170, 198.1, 205, 259, 333.01, 210/335, 411; 166/351

(56) References Cited

U.S. PATENT DOCUMENTS 5,390,741 A * 2/1995 Payton et al. ............... 166/284

OTHER PUBLICATIONS

Frykman, Amy; Oct. 2001; Northern Plains Resource Council; Documentation for Doing It Right: a blueprint for responsible coal bed methane development in Montana.*

* cited by examiner

Primary Examiner—Betsey Morrison Hoey
(74) Attorney, Agent, or Firm—Michael S. Neustel

(57) ABSTRACT

A coal bed methane wastewater treatment system for efficiently and cost effectively treating wastewater generated from coal bed methane production. The coal bed methane wastewater treatment system includes collecting wastewater into an ozone diffusion tank where ozone is injected into the wastewater, passing the wastewater through a prefilter tank and then through a primary membrane. The treated water is separated to a permeate tank and the concentrated water is passed through a secondary membrane for further separation. The concentrated water is then placed within a holding pond for evaporation thereof. The treated water may be utilized to clean the prefilter tank and the membranes. The treated water is then dispensed into a sodium adsorption ratio tank prior to being released to a natural waterway.

20 Claims, 3 Drawing Sheets

COAL BED METHANE WASTEWATER TREATMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to desalination and more specifically it relates to a coal bed methane wastewater treatment system for efficiently and cost effectively treating wastewater generated from coal bed methane production.

2. Description of the Related Art

Coal bed methane ($CH_4$) production has increased greatly since 1987. Methane is a flammable gas (the major constituent of natural gas) trapped in coal fractures by water. When a well is drilled into the coal formation and the water is extracted, the trapped methane gas can also be recovered. Existing coal bed methane wells are producing millions of cubic feet of coal bed methane (CBM), but are also producing millions of gallons of CBM wastewater.

While CBM wastewater (CBMW) is suitable for domestic and stock use, it is generally toxic to plants and crops. CBMW can come from as deep as 700 feet below the surface, and generally contains high concentrations of dissolved salts (e.g. sodium, bicarbonate), making it unsuitable for irrigation. The ratio of dissolved salts (referred to as the sodium absorption ration, or SAR) of CBMW is many times the level native plants and most crops can tolerate. Soil irrigated with CBMW will accumulate these salts, which destroys soil structure and inhibits water absorption by plants.

Surface discharge to natural waterways is the easiest and most economical method of disposing of the CBMW. However, since CBMW has high levels of sodium and bicarbonates, severe environmental concerns have been raised (e.g. wildlife, plants, environment, etc.). Hence, discharging untreated CBMW directly into a natural waterway is not a feasible option.

Another method of treating CBMW is the usage of large wastewater impoundments (a.k.a. "holding ponds", "infiltration ponds", "zero discharge ponds") within the ground surface that receive large volumes of CBMW. The CBMW within the impoundments eventually evaporates and filters into a shallow aquifer within the ground. The main problem with wastewater impoundments is that large acreages of land are required for this process. Another problem with wastewater impoundments is that the impoundments become contaminated with large amounts of sodium. Another problem with wastewater impoundments is that valuable quantities of water are lost to evaporation and shallow aquifers that are easily contaminated.

Another method of treating CBMW is to inject the CBMW back into an aquifer. While this approach avoids surface discharge, there is the potential for contamination of valuable aquifers and other environmental concerns.

Another method of treating CBMW is through conventional reverse osmosis or salt precipitation with an evaporation process that leaves the salt behind and traps the evaporated water. Conventional reverse osmosis is expensive and cost prohibitive with respect to CBMW. Evaporation and salt precipitation treatment is also not economical nor feasible with the large quantities of saline CBMW. Hence, there is a need for a CBMW treatment system that is efficient and cost effective.

While these devices may be suitable for the particular purpose to which they address, they are not as suitable for efficiently treating wastewater generated from coal bed methane production. Conventional CBMW treatments are inefficient and are costly to operate.

In these respects, the coal bed methane wastewater treatment system according to the present invention substantially departs from the conventional concepts and designs of the prior art, and in so doing provides an apparatus primarily developed for the purpose of efficiently treating wastewater generated from coal bed methane production.

BRIEF SUMMARY OF THE INVENTION

In view of the foregoing disadvantages inherent in the known types of wastewater treatment systems now present in the prior art, the present invention provides a new coal bed methane wastewater treatment system construction wherein the same can be utilized for efficiently and cost effectively treating wastewater generated from coal bed methane production.

The general purpose of the present invention, which will be described subsequently in greater detail, is to provide a new coal bed methane wastewater treatment system that has many of the advantages of the wastewater treatment systems mentioned heretofore and many novel features that result in a new coal bed methane wastewater treatment system which is not anticipated, rendered obvious, suggested, or even implied by any of the prior art wastewater treatment systems, either alone or in any combination thereof.

To attain this, the present invention generally comprises collecting wastewater into an ozone diffusion tank where ozone is injected into the wastewater, passing the wastewater through a prefilter tank and then through a primary membrane. The treated water is separated to a permeate tank and the concentrated water is passed through a secondary membrane for further separation. The concentrated water is then placed within a holding pond for evaporation thereof. The treated water may be utilized to clean the prefilter tank and the membranes. The treated water is then dispensed into a sodium adsorption ratio tank prior to being released to a natural waterway.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a coal bed methane wastewater treatment system that will overcome the shortcomings of the prior art devices.

A second object is to provide a coal bed methane wastewater treatment system for efficiently and cost effectively treating wastewater generated from coal bed methane production.

Another object is to provide a coal bed methane wastewater treatment system that conserves valuable water resources during the exploitation of coal bed methane.

An additional object is to provide a coal bed methane wastewater treatment system that removes salts and other debris from coal bed methane wastewater.

A further object is to provide a coal bed methane wastewater treatment system that is capable of treating large volumes of wastewater.

Another object is to provide a coal bed methane wastewater treatment system that is in compliance with state and federal discharge standards.

A further object is to provide a coal bed methane wastewater treatment system that prevents pollution of natural waterways, crops, native plants and water supplies.

Another object is to provide a coal bed methane wastewater treatment system that provides water suitable for irrigation, stock water, recreation and potable usage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
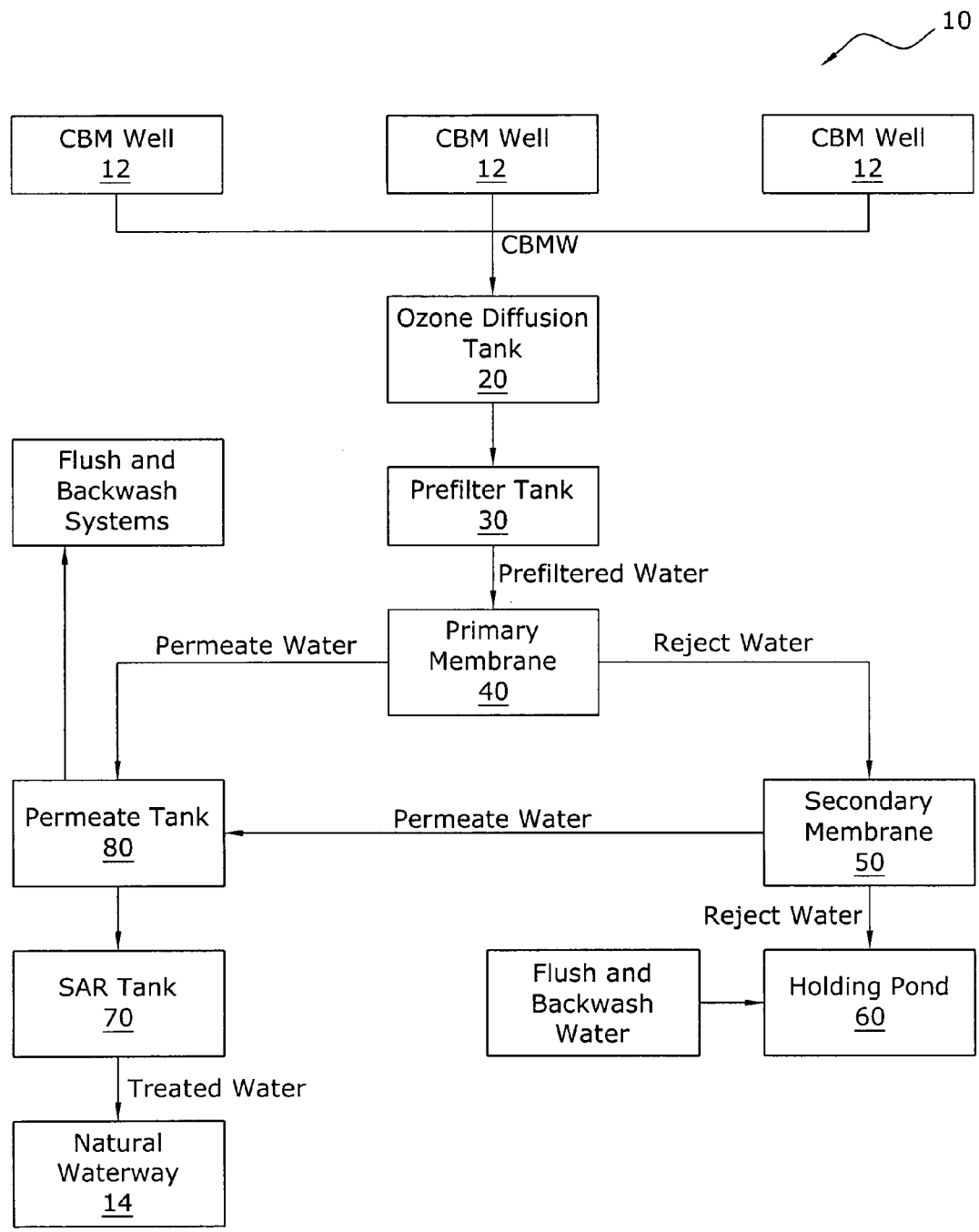
FIG. 1 is a block diagram of the present invention.
Figure 2:
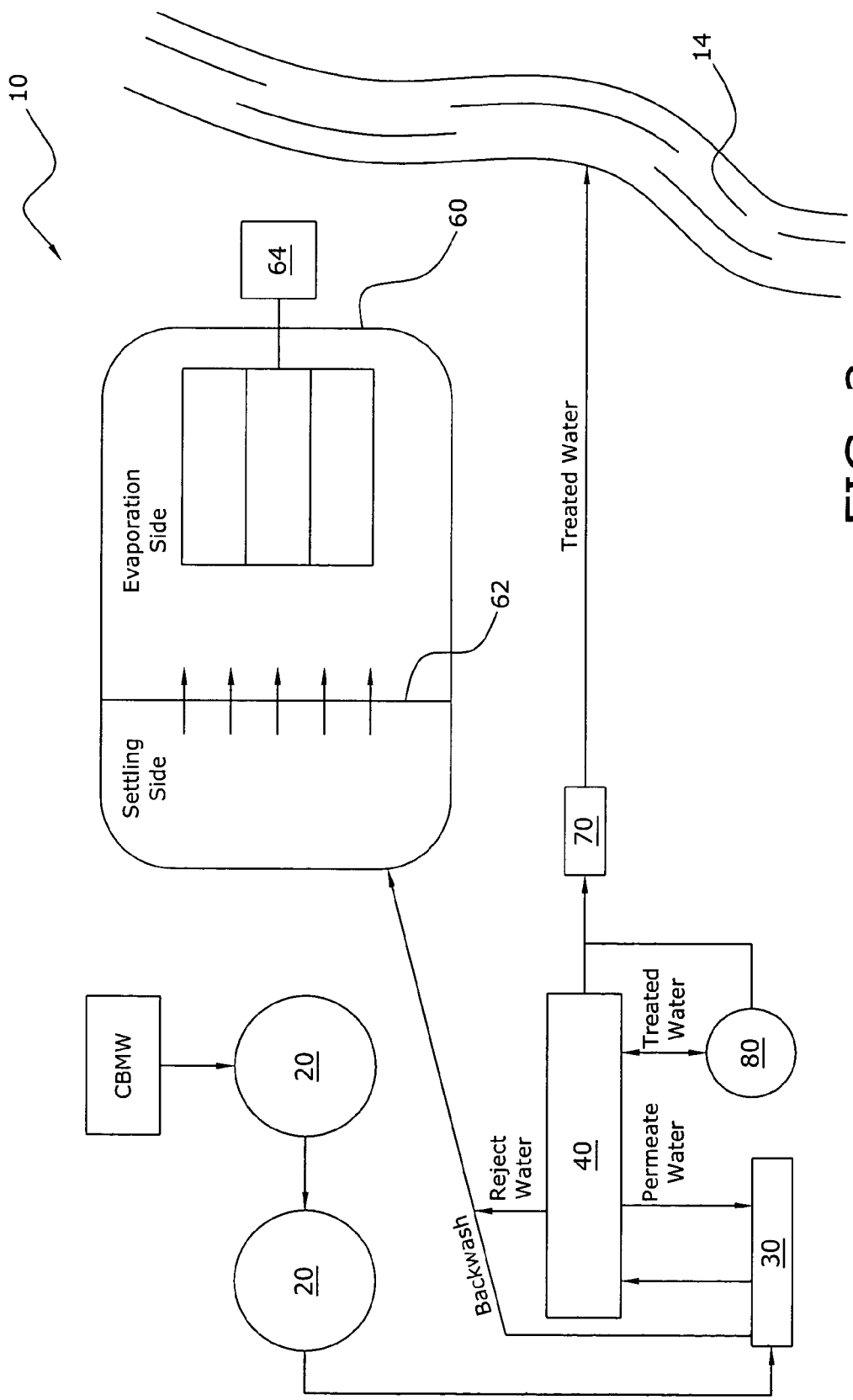
FIG. 2 is a schematic illustration of the present invention.
Figure 3:
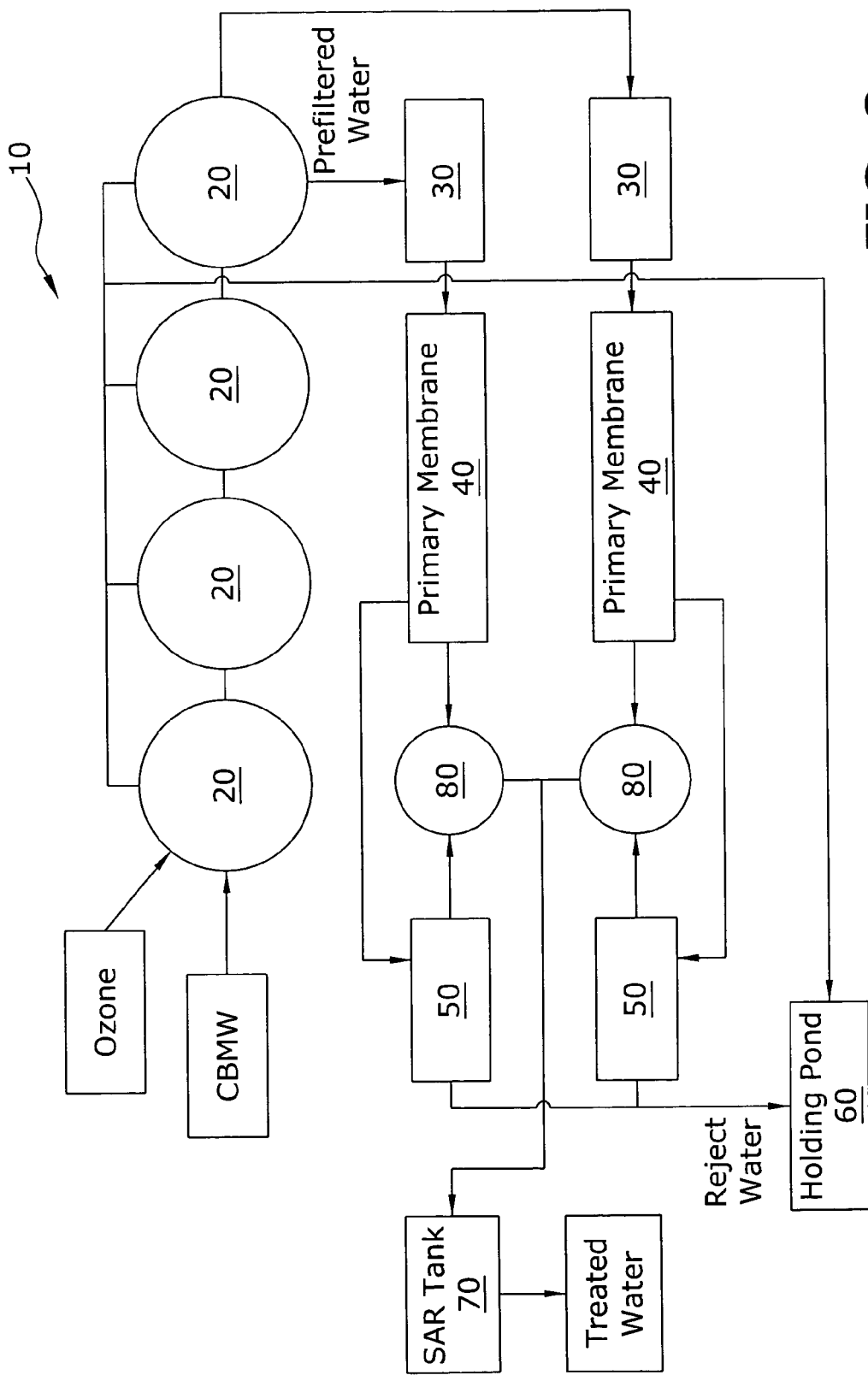
FIG. 3 is a detailed schematic illustration of the present invention.

Turning now descriptively to the drawings, in which similar reference characters denote similar elements throughout the several views, FIGS. 1 through 3 illustrate a coal bed methane wastewater treatment system 10, which comprises collecting wastewater into an ozone diffusion tank 20 where ozone is injected into the wastewater, passing the wastewater through a prefilter tank and then through a primary membrane 40. The treated water is separated to a permeate tank 80 and the concentrated water is passed through a secondary membrane 50 for further separation. The concentrated water is then placed within a holding pond 60 for evaporation thereof. The treated water may be utilized to clean the prefilter tank and the membranes. The treated water is then dispensed into a sodium adsorption ratio tank prior to being released to a natural waterway 14.

B. Coal Bed Methane Wastewater (CBMW)

Coal bed methane wastewater (CBMW) is produced through a coal bed methane well 12 while coal bed methane (CBM) is simultaneously produced. CBM wells 12 are typically arranged close together, so the CBMW is typically combined into a combined pipeline. FIG. 1 illustrates combining the CBMW from a plurality of CBM wells 12 prior to treating the same with the present invention. It can be appreciated that the present invention may be utilized with one or more CBM wells 12.

C. Ozone Diffusion Tank

As shown in FIGS. 1 through 3 of the drawings, the combined CBMW is input into an ozone diffusion tank 20. As shown in FIGS. 1 through 3 of the drawings, a plurality of ozone diffusion tanks 20 may be utilized that provide additional storage and wastewater detention time for the process of coagulation to be completed.

Ozone is injected into the CBMW before entering the ozone diffusion tank 20 and/or within the ozone diffusion tank 20. The injected ozone oxidizes iron, manganese and other metals within the CBMW. The injection of ozone into the ozone diffusion tank 20 also assists to flocculate, coagulate and agglomerate organic compounds and natural clays.

The ozone diffusion tank 20 preferably has a cone bottom for collecting solids from the CBMW. The ozone diffusion tank 20 preferably has a purging functionality that allows for the ozone diffusion tank 20 to be automatically or manually purged to a holding tank for disposal of. The ozone diffusion tank 20 is preferably designed to maximize the interfacing of the ozone molecule with the water molecule.

D. Prefilter Tanks

The CBMW from within the ozone diffusion tank 20 is then transported to one or more prefilter tanks 30. The prefilter tanks 30 are designed to maximize the removal of suspended solids within the CBMW. The prefilter tanks 30 are preferably alternated to allow for continuous filtration of the CBMW while a backwashing cycle is performed on a previously utilized prefilter tank.

The prefilter tanks 30 preferably have one or more perforated screens for removing larger particles within the CBMW. The screens are surrounded and filled to a desired level (e.g. 4 inches) above each of the screens with one or more gradations of ruby garnet.

A filtration media is positioned within the prefilter tanks 30. A exemplary filtration media is comprised of ceramic beads of uniform size and shape. The depth of the filtration media ranges preferably between 24 to 30 inches while allowing approximately fifty-percent free board to prevent the expelling of filtration media during backwashing. Flow rates and pressures are calculated so as to maximize the filtering quality and quantity of the filtration media.

E. Primary Membrane

The CBMW flows from the prefilter tanks 30 into the primary membrane 40 as shown in FIGS. 1 through 3 of the drawings. The CBMW primary membrane 40 separates the dissolved solids from the water molecules. The primary membrane 40 preferably desalinates 90% of the feed water.

The permeate (desalinated) water flows to a permeate tank 80 as further shown in FIGS. 1 through 3 of the drawings. The reject water with the dissolved solids flows to a secondary membrane 50 for further concentration of the reject water.

F. Secondary Membrane

The secondary membrane 50 receives the reject water from the primary membrane 40 as shown in FIGS. 1 through 3 of the drawings. The secondary membrane 50 is preferably a high-pressure membrane for desalinating the CBMW. The primary membrane 40 preferably desalinates 50% of the feed water.

The permeate (desalinated) water flows to a permeate tank 80 as further shown in FIGS. 1 through 3 of the drawings. The reject water with the dissolved solids flows to a holding pond 60 for evaporation.

G. Permeate Tank

The permeate tank 80 is comprised of one or more tanks that retains the permeate water from the primary membrane 40 and the secondary membrane 50. The permeate water within the permeate tank 80 may be utilized to backwash the prefilter tank and for flushing the membranes 40, 50. The flush and backwash water is then distributed to the holding pond 60 as shown in FIG. 1 of the drawings. The permeate water not utilized for flushing and backwashing is then transferred to the SAR tank 70.

H. Sodium Absorption Ratio (SAR) Tank

Permeate water from the permeate tank 80 is then transferred to the SAR tank 70 containing two compartments. The first compartment with the SAR tank 70 is designed with two perforated distributor modules. Gravel and garnet is placed around and above the distributors to protect the distributors while allowing up-flow of permeate water through a calcium carbonate bed. The calcium carbonate is preferably comprised of crushed limestone that dissolves relatively slowly and is easily replenished.

The de-mineralized permeate water dissolves and absorbs the calcium in the calcium carbonate which produces the offsetting calcium required to balance any sodium ion that remains in the permeate water. The first compartment is designed to allow for sufficient detention time for dissolving the calcium but not the calcium carbonate.

The second compartment within the SAR tank 70 is a holding tank with float level controls that allow the treated water to be pumped to a discharge point or natural waterway 14 as shown in FIGS. 1 through 3 of the drawings. The treated water may also be utilized for other purposes such as but not limited to irrigation, drinking or returned to an aquifer.

I. Holding Pond

The holding pond 60 may be comprised of any structure or ground formation capable of receiving/storing a large volume of reject water. Reject water from the secondary membrane 50 along with the flush/backwash water is transferred to the holding pond 60 for evaporation utilizing conventional evaporation technology. The holding pond 60 is preferably positioned in a location that maximizes exposure to prevailing winds.

An evaporation system 64 is preferably utilized within the holding pond 60 which enhances the evaporation of the water within the holding pond 60. The holding pond 60 is preferably designed to have a permeable divider 62 for separating a settling side and an evaporation side as shown in FIG. 2 of the drawings. The evaporation system 64 is positioned within the evaporation side for inputting air into the water to enhance evaporation thereof.

The evaporation system 64 may utilize nozzles that spray the water within the holding pond 60 in a cone or umbrella shaped plume of water. Atomization of the water plume is enhanced by injecting air into a venturi below the nozzles. The venture effect also increases the temperature of the water thereby enhancing the evaporation process.

Another suitable evaporation process is comprised of a heat distillation process which will eliminate a large holding pond 60. Various other technologies may be utilized to comprise the evaporation process.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coal bed methane wastewater treatment system, comprising:
    an ozone diffusion tank that receives coal bed methane wastewater (CBMW) from one or more coal bed methane wells, wherein ozone is injected into said CBMW;
    a prefilter tank fluidly connected to said ozone diffusion tank;
    a primary filter fluidly connected to said prefilter tank; and
    a secondary filter fluidly connected to said primary filter, wherein said secondary filter receives the reject water from said primary filter.

2. The coal bed methane wastewater treatment system of claim 1, including a permeate tank fluidly connected to said primary filter and said secondary filter for receiving the permeate water from said primary filter and said secondary filter.

3. The coal bed methane wastewater treatment system of claim 2, wherein said permeate tank provides backwash water to said prefilter tank for backwashing said prefilter tank.

4. The coal bed methane wastewater treatment system of claim 2, wherein said permeate tank provides flush water to said primary filter for flushing said primary filter.

5. The coal bed methane wastewater treatment system of claim 2, wherein said permeate tank provides flush water to said secondary filter for flushing said secondary filter.

6. The coal bed methane wastewater treatment system of claim 2, wherein said permeate tank is fluidly connected to a natural waterway for dispensing collected permeate water.

7. The coal bed methane wastewater treatment system of claim 6, including a sodium absorption ratio tank positioned between said permeate tank and said natural waterway, wherein said sodium absorption ratio tank dissolves a desired amount of calcium within said permeate water.

8. The coal bed methane wastewater treatment system of claim 1, including a holding pond fluidly connected to said secondary filter for receiving the reject water from said secondary filter.

9. The coal bed methane wastewater treatment system of claim 8, wherein said holding pond is fluidly connected to said prefilter tank, said primary filter and said secondary filter for receiving backwash water and flush water.

10. The coal bed methane wastewater treatment system of claim 8, wherein said holding pond has a settling side and an evaporation side separated by a permeable divider.

11. The coal bed methane wastewater treatment system of claim 10, including an evaporation system for enhancing evaporation of water within said evaporation side.

12. The coal bed methane wastewater treatment system of claim 1, wherein said ozone is injected into said CBMW prior to entering said ozone diffusion tank.

13. A coal bed methane wastewater treatment system, comprising:
   an ozone diffusion tank that receives coal bed methane wastewater (CBMW) from one or more coal bed methane wells, wherein ozone is injected into said CBMW prior to entering said ozone diffusion tank;
   a prefilter tank fluidly connected to said ozone diffusion tank;
   a primary filter fluidly connected to said prefilter tank;
   a secondary filter fluidly connected to said primary filter, wherein said secondary filter receives the reject water from said primary filter;
   a permeate tank fluidly connected to said primary filter and said secondary filter for receiving the permeate water from said primary filter and said secondary filter, wherein said permeate tank provides backwash water to said prefilter tank for backwashing said prefilter tank;
   wherein said permeate tank provides flush water to said primary filter for flushing said primary filter and wherein said permeate tank provides flush water to said secondary filter for flushing said secondary filter;
   wherein said permeate tank is fluidly connected to a natural waterway for dispensing collected permeate water;
   a sodium absorption ratio tank positioned between said permeate tank and said natural waterway, wherein said sodium absorption ratio tank dissolves a desired amount of calcium within said permeate water;
   a holding pond fluidly connected to said secondary filter for receiving the reject water from said secondary filter, wherein said holding pond is fluidly connected to said prefilter tank, said primary filter and said secondary filter for receiving backwash water and flush water;
   wherein said holding pond has a settling side and an evaporation side separated by a permeable divider; and
   an evaporation system for enhancing evaporation of water within said evaporation side.

14. A method of treating coal bed methane wastewater, said method comprising the following steps:
   (a) collecting coal bed methane wastewater (CBMW) from one or more coal bed methane wells;
   (b) injecting ozone into said CBMW;
   (c) inputting said CBMW into an ozone diffusion tank for a period of time;
   (d) prefiltering said CBMW within a prefilter tank;
   (e) filtering said CBMW through a primary filter;
   (f) filtering the reject water from said primary filter through a secondary filter;
   (g) transferring the permeate water from said primary filter and said secondary filter to a permeate tank; and
   (h) transferring the permeate water to a natural waterway.

15. The coal bed methane wastewater treatment system of claim 14, including the step of providing the permeate water from said permeate tank to said prefilter tank for backwashing said prefilter tank.

16. The coal bed methane wastewater treatment system of claim 14, including the step of providing the permeate water from said permeate tank to said primary filter for flushing said primary filter.

17. The coal bed methane wastewater treatment system of claim 14, including the step of dissolving calcium within the permeate water prior to said step (h) transferring the permeate water to said natural waterway.

18. The coal bed methane wastewater treatment system of claim 14, including the step of transferring the reject water from said secondary filter to a holding pond.

19. The coal bed methane wastewater treatment system of claim 18, including the step of transferring the backwash water and the flush water to said holding pond.

20. The coal bed methane wastewater treatment system of claim 18, including the step of enhancing the evaporation of water within said holding pond.

* * * * *